(12) United States Patent
Sugaya et al.

(10) Patent No.: US 6,567,386 B1
(45) Date of Patent: May 20, 2003

(54) POLLING CONTROL METHOD, TRANSMISSION CONTROL APPARATUS AND TRANSMISSION APPARATUS

(75) Inventors: Shigeru Sugaya, Kanagawa (JP); Takanobu Kamo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/256,935

(22) Filed: Feb. 24, 1999

(30) Foreign Application Priority Data

Feb. 27, 1998 (JP) .......................................... 10-047415

(51) Int. Cl.[7] .............................................. H04B 7/212
(52) U.S. Cl. ........................ 370/322; 370/346; 370/348
(58) Field of Search ................................. 370/322, 321, 370/327, 346, 347, 348, 449; 340/443, 3.51

(56) References Cited

U.S. PATENT DOCUMENTS

| | | | | |
|---|---|---|---|---|
| 4,204,093 A | * | 5/1980 | Yeh ............................. 370/323 |
| 4,763,325 A | * | 8/1988 | Wolfe et al. ................. 370/322 |
| 5,012,469 A | * | 4/1991 | Sardana ....................... 370/322 |
| 5,276,703 A | * | 1/1994 | Budin et al. ................. 370/347 |
| 5,754,535 A | * | 5/1998 | Vandenabeele et al. ..... 370/347 |
| 5,960,000 A | * | 9/1999 | Ruszczyk et al. ........... 370/447 |
| 5,982,765 A | * | 11/1999 | Shimada ...................... 370/347 |

\* cited by examiner

*Primary Examiner*—Chau Nguyen
*Assistant Examiner*—Keith M. George
(74) *Attorney, Agent, or Firm*—Jay H. Maioli (57) ABSTRACT

Within a frame period there are defined a managing data transmission area and a data transfer area. Within the managing data transmission area there is made a transmission of data for determining a state of polling control and within the data transfer area there is performed the communication among a plurality of the communicating stations through the polling control based on the data transmitted within the managing data transmission area. As a result of this, in a case where access management of the communication is performed by polling, the transmission efficiency within the network is enhanced.

11 Claims, 7 Drawing Sheets

FIG. 4A Frame Construction

FIG. 4B Construction of Synchronizing Area

FIG. 4C Construction of Data Transfer Area

FIG. 5

FIG. 6A  Frame Construction

FIG. 6B  Construction of Synchronizing Area

FIG. 6C  Construction of Data Transfer Area

FIG. 7A  Frame Construction

FIG. 7B  Construction of Synchronizing Area

FIG. 7C  Construction of Data Transfer Area

FIG. 8

POLLING CONTROL METHOD, TRANSMISSION CONTROL APPARATUS AND TRANSMISSION APPARATUS

BACKGROUND OF THE INVENTION

1. Field of the Invention

The present invention relates to a polling control method which is suitably applied to a case where a transmission of various data items is made by means of, for example, a radio signal to thereby construct a local area network (LAN) among a plurality of appliances, and a transmission control apparatus and a transmission apparatus to each of which this polling control method is applied.

2. Description of the Related Art

Conventionally, in a case where constructing a local area network within a relatively narrow range such as a home, an office or the like so as to enable a transmission to be made, among a plurality of appliances such as various video appliances, personal computer apparatuses and their peripheral apparatuses or the like, of data that are handled by such appliances, instead of causing direct connections to be made among the appliances by the use of some signal line or other it is sometimes arranged to enable data transmission to be made through radio transmission by connecting radio signal transmission and reception apparatuses (radio transmission apparatuses) to the respective appliances.

Since a local area network is constructed through the operation of radio transmission, it is unnecessary to make direct connections among the respective appliances by means of signal lines or the like and it is possible to simplify the construction of the system.

Meanwhile, in a case where a plurality of radio transmission apparatuses are prepared and a local area network has been made up of these apparatuses, when signals are simultaneously transmitted from a plurality of transmission apparatuses, there is a possibility that a transmission error will occur. For this reason, it is necessary to perform access control by some method or other of the communication made among the respective transmission apparatuses within the network.

As the access control method that is conventionally known, there is a method of unitarily managing, in, for example, a small-scale radio network, the communication among the respective transmission apparatuses (nodes) within the network by the use of a transmission apparatus (root node) located at a central part of the star-connected version. As a general interference avoiding method in this case, there was used a band reserving method in which a band for each transmission path is reserved regardless of the presence or absence of transmission data, whereby transmission is performed through the use of this reserved band. However, this method had the problem that in even a case where no data exists that is to be transmitted, there is the need to ensure the band for use on a corresponding transmission path, with the result that the network resources are used for nothing and therefore the efficiency with which such resources are used is very low.

As the access method that has solved the above-described problem, there is a method of performing communications within the network through the performance of a polling control. In this method, it is arranged to use one arbitrary transmission apparatus within the network as a control station (root node) and for the root node to transmit a control signal for performing polling sequentially to other nodes within the network to thereby cause the transmissions from the respective nodes to be performed sequentially through the performance of the polling. By performing the transmission processing through the performance of the polling, it is possible to improve the transmission efficiency.

On the other hand, in even a case where a construction is made wherein the access control is performed by polling, there is the problem that when the number of the transmission apparatuses (nodes) within the network becomes large, the transmission efficiency becomes inferior. Namely, if the number of the nodes within the network is small, even when the polling is performed sequentially with respect to every node within the network, this does not raise a problem which is so serious. However, assuming a case wherein there are, for example, a number of nodes within the network and only a small number of nodes alone among them each have data therein that is to be transmitted therefrom, the amount of polling performed with respect to the nodes having no transmission data comes to increase and this is followed by transmission in large number of only the control signals for use on the polling control alone. This inconveniently decreases the transmission efficiency of the network and necessitates the transmission by the root node of the control signals for polling in large number and this imposes a heavier load onto the root node.

Also, in a case where each node within the network is constructed as being, for example, portable, it is necessary to perform movement management for the node through the operation of the root node and therefore it is necessary for each node to make a return transmission of a response signal with respect to polling performed from the root node. In this way, in the case of the construction wherein it is at all times necessary to make a return transmission of a response signal with respect to polling, even a node having no transmission data therein is always needed to perform communication processing for responding to polling. For this reason, the power consumption of each node inconveniently increases.

SUMMARY OF THE INVENTION

Accordingly, an object of the present invention is, in a case where access management for communication is performed by polling, to enhance the transmission efficiency within the network and so on.

A polling control method of the present invention is arranged to define a managing data transmission area and a data transfer area within a frame period, perform within the managing data transmission area the transmission of data for determining a state of polling control, and perform within the data transfer area the communication among a plurality of the communicating stations through the polling control of a control station based on the data transmitted within the managing data transmission area.

According to the polling control method of the present invention, it is possible for the control station to obtain through the communication made using the managing data transmission area information that is necessary when performing the polling control within the data transfer area.

Also, a transmission control apparatus of the present invention is arranged to receive data for determining a state of polling control at a timing determined as the managing data transmission area within the frame period and transmit a polling control signal for causing a transmission to be made from a terminal apparatus at a timing determined as the data transfer area based on the data that has been received within the managing data transmission area.

According to the transmission control apparatus of the present invention, a state of polling control is determined based on the data that has been received in the managing data transmission area within the frame period and, in the state wherein this determination has been made, the polling control of the terminal apparatus is performed with the use of the data transfer area.

Also, the transmission apparatus of the present invention, a frame period is set based on a prescribed synchronizing signal and a managing data transmission area and a data transfer area are set within the set frame period, and there is transmitted within the managing data transmission area a signal for ensuring a transmission path and there is performed data transmission within the data transfer area based on a polling control signal from the control apparatus.

According to the transmission apparatus of the present invention, in a case where there is the need to ensure a transmission path, a corresponding signal is transmitted within the managing data transmission area within the frame period and, within the data transfer area, there is performed a wait processing of waiting until a polling control signal is transmitted.

DETAILED DESCRIPTION OF THE PREFERRED EMBODIMENTS

A first embodiment of the present invention will now be explained with reference to FIGS. 1 to 5.

Figure 1:
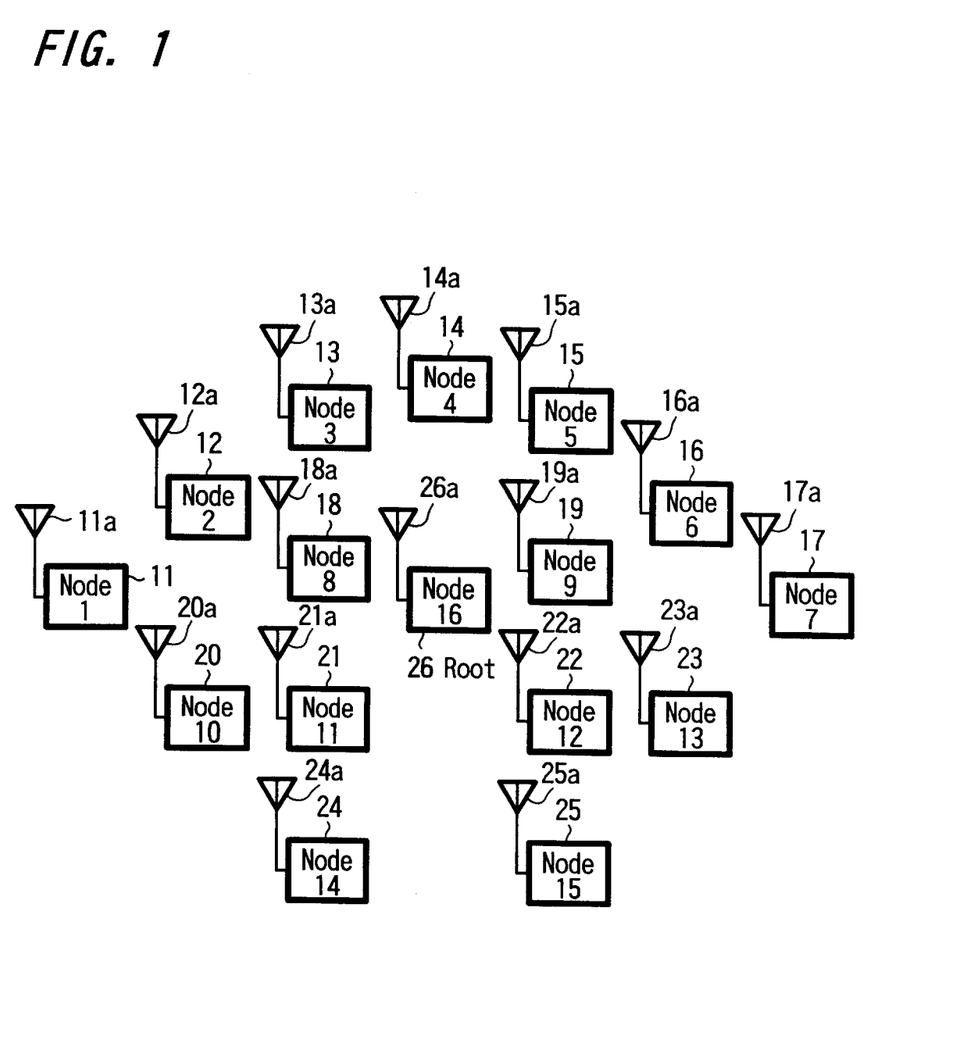
FIG. 1 is a view illustrating the construction of a communication system according to a first embodiment of the present invention.

In this first embodiment, the invention is applied to a communication network system that has been constructed as a system for performing transmission and reception of video data, audio data, computer data, etc. within, for example, a home, an office relatively small in scale, or the like. First, the construction of the system according to this embodiment will be explained with reference to FIG. 1. The network system according to this embodiment is arranged in such a way that a network is made up of radio transmission apparatuses the number of which is sixteen at maximum. FIG. 1 illustrates a state where the sixteen radio transmission apparatuses 11 to 26 are disposed. The respective radio transmission apparatuses 11 to 26 have connected thereto antennas 11a to 26a through which transmission and reception are made. To the respective radio transmission apparatuses 11 to 26 there are individually connected various processors (not illustrated) such as a video signal reproduction apparatus, a monitor apparatus, a computer apparatus, a printer apparatus, etc. When data transmission is needed among these processors, data transmission is performed by way of the radio transmission apparatuses to which those processors are connected. The sixteen radio transmission apparatuses 11 to 26 function as nodes which are communicating stations and are individually given addresses as first to sixteenth nodes.

In this case, the system is constructed in such a way that an arbitrary one radio transmission apparatus within the network system is set as a root node functioning as a control station and the radio communication among the respective nodes is executed through a polling control made from this root node. As the root node there is fundamentally used a radio transmission apparatus that has been disposed at a position enabling direct radio communication thereof with all other nodes within the system. Here, there is used a so-called "construction of star-type connection" wherein the radio transmission apparatus 26 disposed substantially at a center of the interior of the network system is used as the root node and from this central root node there are controlled the other surrounding nodes.

Figure 2:
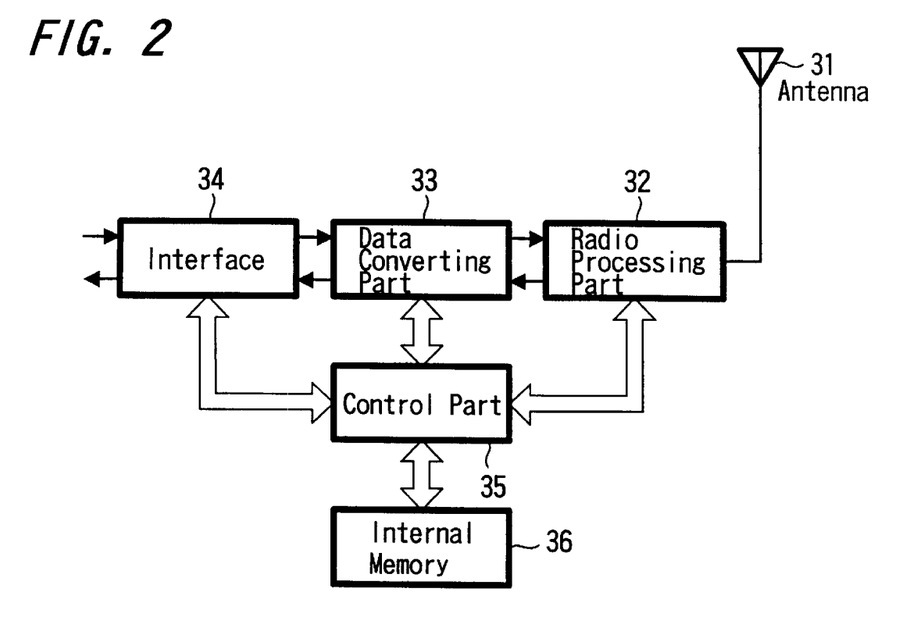
FIG. 2 is a block diagram illustrating the construction of a transmission apparatus according to the first embodiment of the present invention.

An example of the construction of each of the radio transmission apparatuses 11 to 26 constituting each of the nodes is illustrated in FIG. 2. In this case, the respective radio transmission apparatuses 11 to 26 are each fundamentally made to have a common construction (only the control construction of a node made to function as the root node differs from the construction of the other nodes) and are each made to have a construction which is equipped with an antenna 31 for making transmission and reception and a radio processing part 32 connected to the antenna 31 to perform radio transmission and radio reception processing, to thereby enable radio transmission to be made between itself and another transmission apparatus. In this case, as the frequency of a signal transmitted and received by the radio processing part 32 of this embodiment there is used, for example, a very high frequency band (e.g., 5 GHz band). Also, in the case of this embodiment, with regard to the transmission output, there is set a relatively weak output which, for example, in a case where the transmission apparatus is used indoors, is made to have an output which enables radio transmission within a distance of from several meters to several tens of meters or so.

And, the radio transmission apparatus is equipped with a data converting part 33 that performs data conversion on a signal received by the radio processing part 32 and performs data conversion on a signal transmitted from the radio processing part 32. Whereby, it has a construction wherein data that has been converted by this data converting part 33 is supplied to the processor connected thereto through an interface part 34 and data that is supplied from the connected processor is supplied to the data converting part 33 through the interface 34 and can be conversion processed there.

The respective parts of the interior of the radio transmission apparatus are constructed to execute their processing based on the control of a control part 35 made up of a microcomputer, etc. In this case, when the signal that has been received by the radio processing part 32 is a control signal, the thus-received control signal is supplied to the control part 35 through the data converting part 33, whereby the control part 35 sets each of the respective parts to be in a state indicated by this received control signal. Further, a control signal that is to be transmitted from the control part 35 to another transmission apparatus, also, is supplied from the control part 35 to the radio processing part 32 through the data converting part 33 so as to make a radio transmission of it. In a case where the received signal is a synchronizing signal, the control part 35 determines the receiving timing of this synchronizing signal, sets a frame period based thereon, and executes communication control processing by the use of this frame period. Also, to the control part 35 there is connected an internal memory 36 into which there is stored temporarily data necessary for the control of the communication.

A layer structure permitting transmission processing to be made within the network made up of the radio transmission apparatuses each having the above-described construction will now be explained with reference to FIG. 3. The construction for transmission processing according to this embodiment is made up of an upper-order layer, a link layer and a lower-order layer. Application software processing necessary for the control of the transmission, processing necessary for the data transmission and reception between an apparatus connected to the transmission apparatus and this transmission apparatus, etc. correspond to the upper-order layer. Conversion processings for converting the data supplied to the link layer according to the control of the upper-order layer to data having a construction for use in the transmission and for converting the data received thereby to data for being output according to the control of the upper-order layer correspond to the link layer. Radio transmission processing on data supplied from the link layer and supply processing for supplying the reception processed data to the link layer correspond to the lower-order layer, and include frequency conversion and amplification processing performed for the purpose of transmission and reception or the like.

Figure 3:
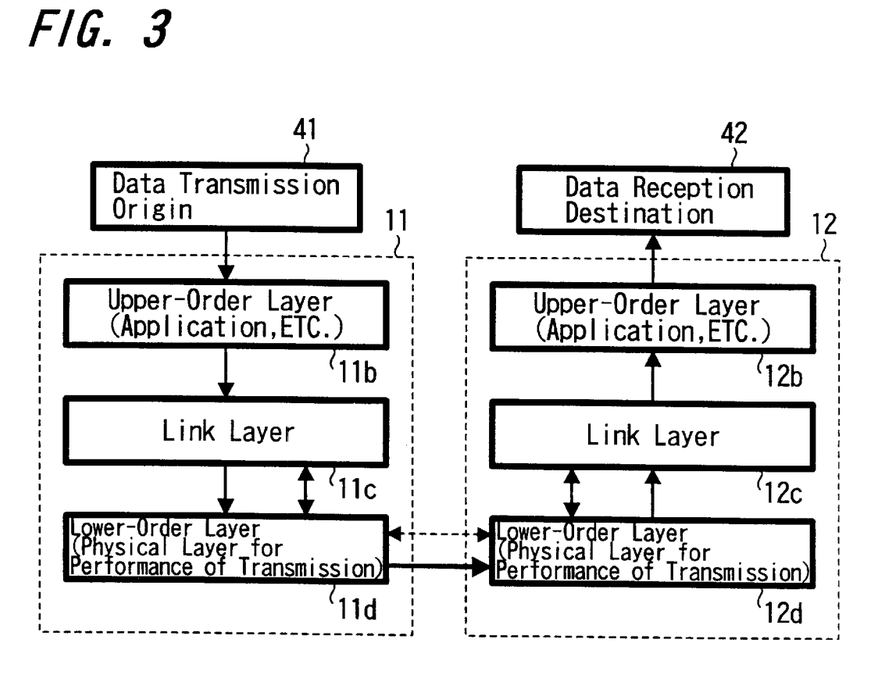
FIG. 3 is a block diagram illustrating a layer structure according to the first embodiment of the present invention.

In FIG. 3, an illustration is made of a state that prevails when data is transmitted from a data transmission origin 41 connected to the first node (radio transmission apparatus 11) to a data reception destination 42 connected to the second node (radio transmission apparatus 12). Here, this will be explained by way of an example wherein a video reproduction apparatus and a monitor image receiver are used respectively as the data transmission origin 41 and the data reception destination 42, whereby video data or the like reproduced by the video reproduction apparatus is supplied to the monitor image receiver through radio transmission to thereby cause images to be received.

The data such as video data or the like that has been output from the video reproduction processing apparatus constituting the data transmission origin 41 is conversion processed by the interface part corresponding to the upper-order layer 11b of the radio transmission apparatus 11. Thereafter, it is coded into data for use in transmission by the data converting part corresponding to the link layer 11c, and this coded data is transmitted as a radio signal having a prescribed frequency band from the radio processing part corresponding to the lower-order layer 11d.

On the radio transmission apparatus 12 side, this radio signal is reception processed by the radio processing part corresponding to the lower-order layer 12d, is decoding processed by the data converting part corresponding to the link layer 12c, and is converted to a form suitable for being output by the interface part corresponding to the upper-order layer 12b. Thereafter, the resulting signal data is supplied to the monitor image receiver constituting the data reception destination 42.

Here, while between the radio transmission apparatus 11 and radio transmission apparatus 12 radio transmission is performed of necessary data such as video data or the like, it is arranged in this embodiment that the processing for setting a transmission path therefor is executed through the polling control performed by the root node that has been set as a control station. The construction of transmission data with respect to which this polling control is performed will hereafter be explained.

Figure 4A:
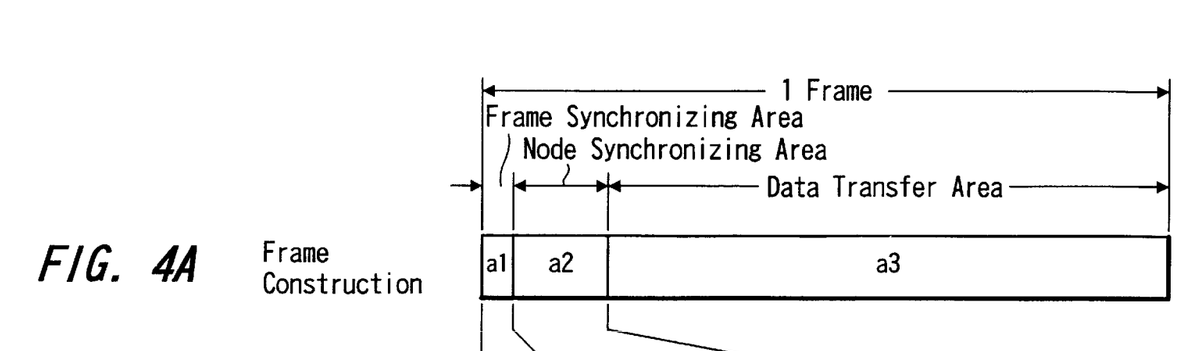
FIGS. 4A~4C are explanatory views illustrating a transmission data construction according to the first embodiment of the present invention.
Figure 4B:
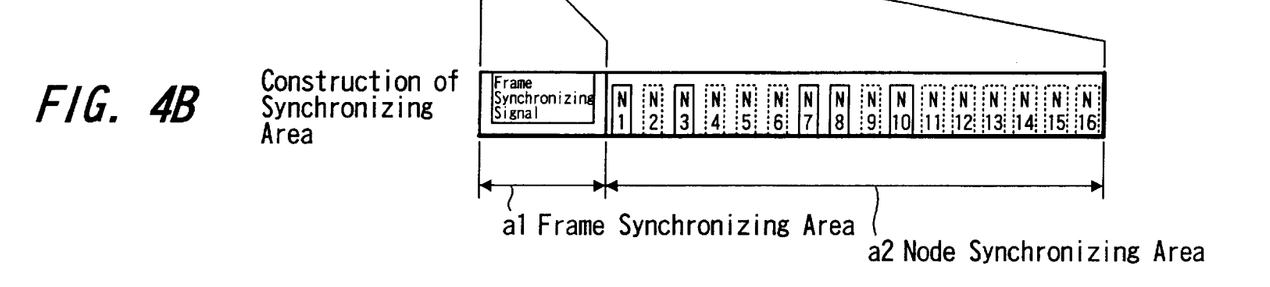

FIG. 4 illustrates the construction of a signal that is transmitted among the nodes (radio transmission apparatuses 11 to 26) that fall within the network system according to this embodiment. This embodiment is set as having a construction wherein data transmission is performed through the defining of a frame period. Namely, as illustrated in the row A of FIG. 4, a 1-frame period is defined as having a prescribed length and, in the leading portion of the 1-frame period, a frame synchronizing area a1 and a node synchronizing area a2 which constitute a managing data transmission area are set as having prescribed time periods, respectively. And the remaining time period is set as a data transfer (transmission) area a3. As illustrated in the row B of FIG. 4, during the time period corresponding to the frame synchronizing area a1, a frame synchronizing signal is transmitted from the root node. This frame synchronizing signal is received by other nodes, whereby with the reception timing at which this frame synchronizing signal has been received being used as a basis the frame period is set in every node. The frame synchronizing signal is constituted by data composed of a prescribed number of bits and has annexed thereto identification number data, for example, that is specific for the network system.

Within the node synchronizing area a2, sixteen slots are set at an equal interval and these sixteen slots within the 1 frame are allotted respectively to the sixteen nodes within the network system. As a method of allotting, for example, from the head slot, the first, second, —and sixteenth slots are sequentially set as a slot N1 for the first node, a slot N2 for the second node,—and a slot N16 for the sixteenth node, respectively. On the side of the slots N1 to N16 allotted to the respective nodes, when it is wanted to ensure a transmission path for use on the node corresponding to a relevant slot, it is arranged to transmit a node synchronizing signal from this node under the control performed by the control part of it. To the node synchronizing signal there is annexed, for example, address number data imparted to each node.

In the example illustrated in the row B of FIG. 4, illustration is made of a state where regarding the slots N1, N3, N7, N8 and N10 each indicated by the enclosure made by a solid line the transmission of a node synchronizing signal is made from the node corresponding to each of these relevant slots and regarding the remaining slots each indicated by the enclosure made by a broken line the transmission of no node synchronizing signal is made. As the nodes which are transmitting the node synchronizing signals it is considered that there are the node in which there is data to be transmitted or received, the node which is on standby in a state of its being able to make a transmission and reception, etc. As the nodes which are transmitting no node synchronizing signals it is considered that there are the node which is in a state of its having connected thereto no data processor, etc., the node regarding which even when it has connected thereto such data processor, etc. the power (the power of the transmission apparatus or the power of the information processor) is kept "off".

The node synchronizing signal that is transmitted to each slot of the node synchronizing area a2 is arranged to be received by the root node and to be determined thereon by, for example, the control part thereof. At this time, from the judgement of the position of the slot that has received the node synchronizing signal, it is possible to determine from what node the node synchronizing signal has been transmitted. In a case where the node has an address number annexed thereto, a determination of node may be made from this address number.

Figure 4C:
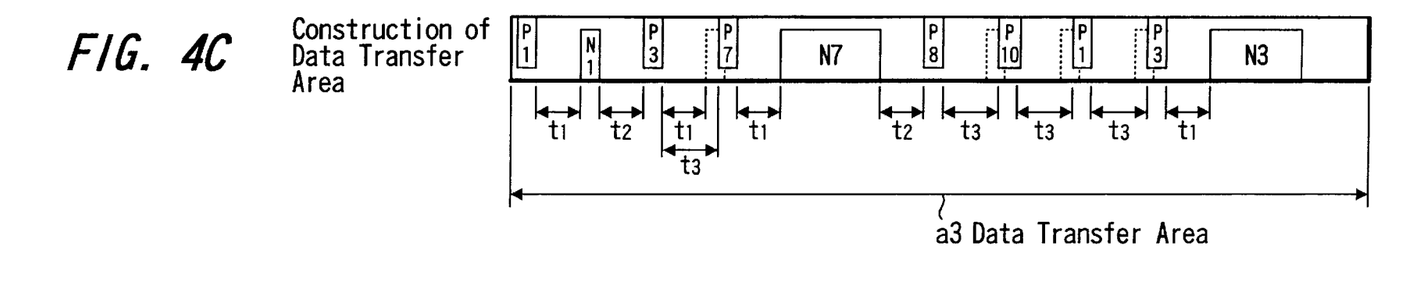

And the control part of the root node performs polling control for the data transmission made through the use of the data transmission area a3 based on the state where the node synchronizing signal has been received thereby. Namely, in the data transmission area a3, the control part of the root node transmits a response-to-polling request signal serving as a polling control signal sequentially to the nodes each needed to have a transmission path ensured for use thereon and thereby causes relevant nodes to answer. Namely, in this example, as illustrated in the row B of FIG. 4, assuming that in the node synchronizing area a2 there prevails a state where node synchronizing signals are being transmitted from the first node (slot N1), the third node (slot N3), the seventh node (slot N7), the eighth node (slot N8) and the tenth node (slot N10), in the data transmission area a3 from the root node there are transmitted as illustrated in the row C of FIG. 4, a response-to-polling request signal P1 with respect to the first node, a response-to-polling request signal P3 with respect to the third node, a response-to-polling request signal P7 with respect to the seventh node, a response-to-polling request signal P8 with respect to the eighth node and a response-to-polling request signal P10 with respect to the tenth node. To the respective response-to-polling request signals P1, P3, P7, P8 and P10 there are annexed transmission destination addresses.

Here, in the node having an address designated by the response-to-polling request signal, when this node has data that is to be transmitted, upon its reception of this response-to-polling request signal it immediately performs transmission processing of the data. As the transmission processing performed at this time, it is considered to selectively use, for example, data transmission made in asynchronous transmission mode and data transmission made in isochronous transmission mode according to the kind of the data to be transmitted. Regarding the asynchronous transmission mode and the isochronous transmission mode, the former is used for the transmission of relatively short data such as control data and the latter is used for the transmission of data needed to be transmitted on a real time basis such as video data, audio data or the like.

In the example illustrated in the row C of FIG. 4, when the response-to-polling request signal P1 is transmitted from the root node (the sixteenth node 26), after a time period $t_1$ needed to decode and discriminate this signal P1 received by the first node 11 has lapsed, a response signal N1 having relatively short data is transmitted from the first node 11. Upon transmission of this response signal N1, the signal N1 is received by the node having a transmission destination address annexed thereto and is received also by the root node. After a time period $t_2$ needed for the root node to decode and discriminate the signal received thereby has lapsed, the response-to-polling request signal P3 with respect to a next node (third node) is transmitted from the root node.

Here, at this time, when the third node 13 is in a state having no data to be transmitted, it does not transmit a response signal. Namely, in the case of this embodiment, it is arranged that when the respective nodes are in a state having no data to be transmitted therefrom, each of them transmits no response signal even when the response-to-polling request signal has been transmitted thereto. On the side of the root node, when the root node has discriminated that no signal is transmitted even when a time period $t_3$ which is somewhat longer than the time period $t_1$ from the transmission of the response request signal to the transmission of a response signal has lapsed, the root node determines that the relevant node has no transmission data and sends a response-to-polling request signal to a next node (here the response-to-polling request signal P7 with respect to the seventh node). The example of the response signal N7 sent from the seventh node, illustrated in the row C of FIG. 4, refers to a case where, for example, relatively long data has been transmitted in the isochronous transmission mode.

In this way, so long as the data transmission area a3 of the 1 frame period continues, the root node transmits the response-to-polling request signal sequentially. In the frame example illustrated in the row C of FIG. 4, when the root node transmits the response-to-polling request signal P3 to the third node 13 and a response signal N3 has been transmitted from this third node 13, since the remaining time period of the data transmission area a3 is not long sufficient to cause data transmission through polling, at this point in time there is terminated the polling processing performed through the use of this area a3. And, when the data transmission area of a next frame period comes, the polling processing is re-started from the transmission of the response-to-polling request signal with respect to the next node (here the seventh node 17).

Figure 5:
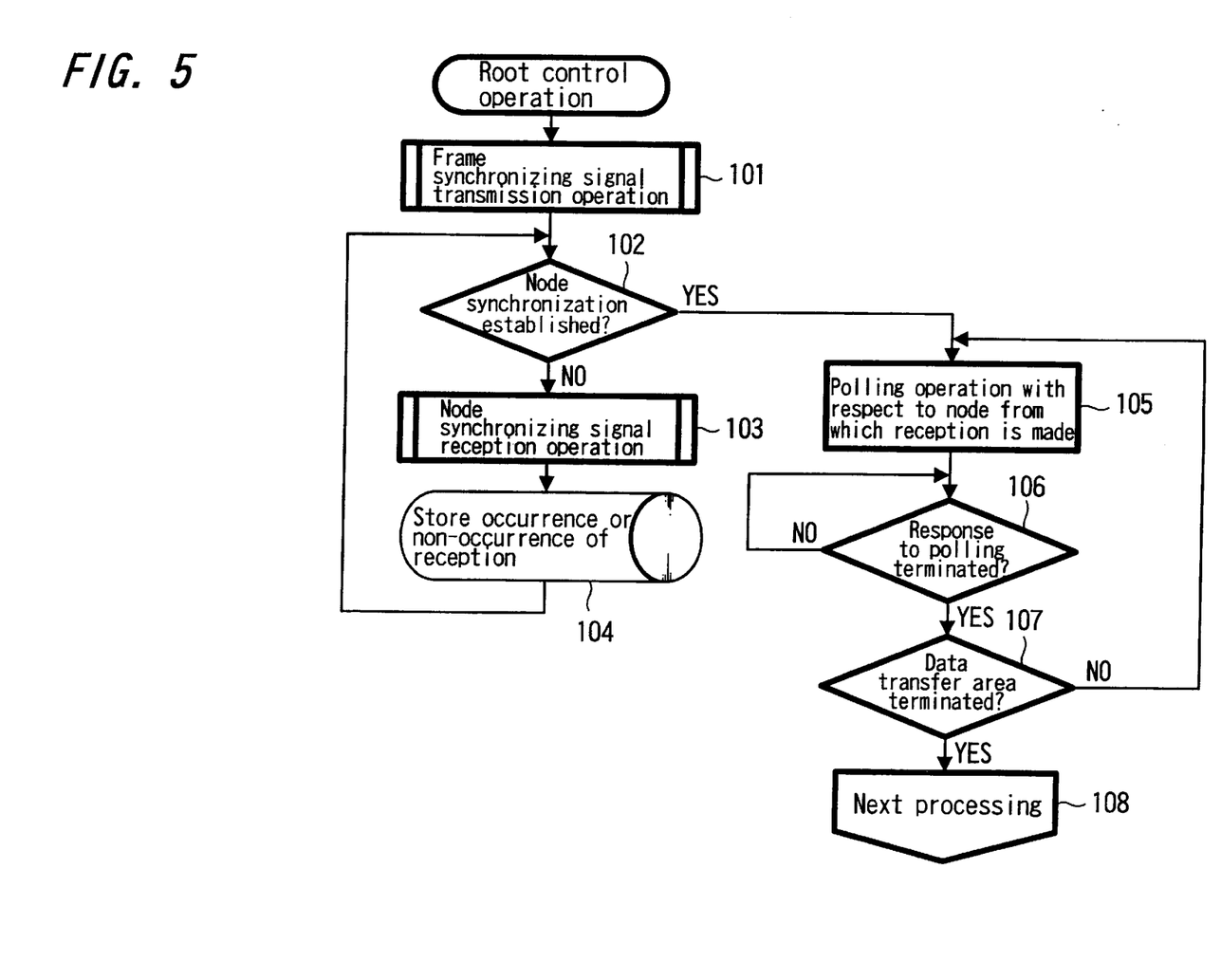
FIG. 5 is a flow chart illustrating a polling node selecting condition according to the first embodiment of the present invention.

Here, the processing of selecting the polling node which in a case where the data transmission processing are performed in this way is executed by the control part of the root node will now be explained with reference to a flow chart of FIG. 5. As the control operation performed in the root node, first, the transmission operation of transmitting a frame synchronizing signal is performed (step 101) and it is determined next whether or not a node synchronization has been established (step 102). Since immediately after transmission of a frame synchronizing signal has been made the node synchronization has not yet been established, the process proceeds to step 103 in which the reception operation of receiving a node synchronizing signal is performed. At this time, the control part of the root node stores whether or not reception is made with regard to the respective slots within the node synchronizing area (step 104), the process proceeding to the determination made in step 102.

When it has been determined in step 102 that the node synchronization has been established, the process proceeds to step 105 in which the polling operation (i.e., the transmission operation of transmitting a response-to-polling request signal) with respect to the node from which the node synchronizing signal that has been received has been transmitted is performed based on the data stored already in step 104. Here, it is determined whether or not the response to the polling operation has been terminated (step 106) and, when a termination has been made, it is determined whether or not the data transmission area (data transfer region) is terminated (step 107). In a case where the rest of the data transmission area is still sufficient to perform the polling operation, the process returns to step 105 in which the polling operation with respect to a next node is performed. When it has been determined in step 107 that the rest of the data transmission area is not sufficient, the processing performed on this frame period is terminated whereby a transfer is made to the processing for the next frame period (step 108).

By the processing performed in this way, the radio transmission among the respective nodes within the network is excellently performed with a high efficiency through the polling control of the root node. That is, the root node determines the nodes each needed to ensure a transmission path for use thereon according to the data that have been obtained during the node synchronizing areas of the respective frames and is only needed to transmit the response-to-polling request signals each constituting the polling control signal to such nodes. In other words, the root node is not needed to transmit the response-to-polling request signal to every node within the network, with the result that highly efficient transmission processing can be performed.

Also, in this embodiment, it is arranged that when having transmitted the response-to-polling request signal to each node, no response signal is caused to be transmitted where the reception node has no data therein that is to be transmitted therefrom. As a result of this, each node is only needed to transmit the response signal with respect to the polling performed thereon only when having data therein that is to be transmitted therefrom. This makes it possible to omit the transmission processing of the response signal that would otherwise be performed when there is no transmission signal. Therefore, it is possible to simplify the processing performed by each node (especially the processing that is to be performed when the node is on standby in a state having no transmission data) to that extent.

Also, as a result of causing no response signal to be transmitted from each node when the same has no data therein that is transmitted therefrom in this way, on the root node side it is possible to detect that the transmission of no response signal is made and immediately start the next polling operation. This can shorten the time period needed to perform the polling operation. Namely, in the example illustrated in the row C of FIG. 4, when having discriminated that no response signal is transmitted even when the time period $t_3$ somewhat longer than the time period $t_1$ covering from the point in time when the response-to-polling request signal P3 of the sequentially transmitted response-to-polling request signals P1, P3, P7—has been transmitted to the point in time when the response signal is to be transmitted has lapsed, the root node determines that no data exists which is to be transmitted from the third node and can immediately transmit the response-to-polling request signal P7 to the next node (the seventh node). Namely, the root node can more quickly start the next polling operation compared to the case where starting the next polling operation after decoding the response signal from the third node. This enables data transmission to be more greatly made within the time period corresponding to the data transmission area to that extent. Thus, the transmission band as prepared can more efficiently be used.

Figure 6A:
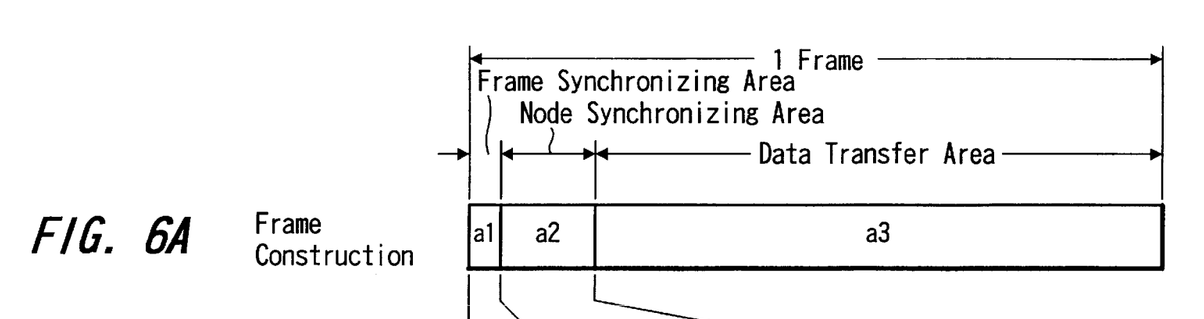
FIGS. 6A~6C are explanatory views illustrating a transmission data construction according to a second embodiment of the present invention.

Next, a second embodiment of the present invention will be explained with reference to FIG. 6.

In this second embodiment, as similar to the case of the first embodiment mentioned above, the invention is applied to a network system which has been constructed as a system for performing transmission and reception of video data, audio data, computer data, etc. within a home, an office relatively small in scale, or the like. The construction of the network system is the same as that (for example, the construction illustrated in FIG. 1) explained in the first embodiment. That is, the network system according to this embodiment is arranged in such a way that a network is made up of radio transmission apparatuses the number of which is sixteen at maximum. To the respective radio transmission apparatuses there are individually connected various processors such as a video signal reproduction apparatus, a monitor apparatus, a computer apparatus, a printer apparatus, etc. When data transmission is needed among these processors, data transmission is performed by way of the radio transmission apparatuses to which those processors are connected. The sixteen radio transmission apparatuses function as nodes which are communicating stations and are individually given addresses as first to sixteenth nodes. Also, the system is constructed in such a way that an arbitrary one radio transmission apparatus within the network system is set as a root node functioning as a control station and the radio communication among the nodes is executed through a polling control made from this root node.

The construction of each radio transmission apparatus is fundamentally the same as that (for example, the construction illustrated in FIG. 2) explained in the first embodiment, excepting that the control construction in the control part somewhat differs from that in the first embodiment. In this embodiment, the state of transmission processing differs from that explained in the first embodiment.

The state of transmission processing thereof will hereafter be explained. FIG. 6 illustrates the construction of a signal that is transmitted among the nodes that fall within the network system according to this embodiment. This embodiment is set as having a construction wherein data transmission is performed through the defining of a frame period. Namely, as illustrated in the row A of FIG. 6, a 1-frame period is defined as having a prescribed length, in which an initial prescribed time period of this 1-frame period is set as a frame synchronizing area a1, a next prescribed time period is set as a node synchronizing area a2, and the remaining time period is set as a data transmission area a3. As illustrated in the row B of FIG. 6, during the time period corresponding to the frame synchronizing area a1, a frame synchronizing signal is transmitted from the root node. This frame synchronizing signal is received by other nodes, whereby with the reception timing at which this frame synchronizing signal has been received being used as a basis the frame period is set in every node. The frame synchronizing signal is constituted by data composed of a prescribed number of bits and has annexed thereto identification number data, for example, that is specific for the network system.

Within the node synchronizing area a2, sixteen slots are set at an equal interval and these sixteen slots within the 1 frame are allotted respectively to the sixteen nodes within the network system. As a method of allotting, for example, from the head slot, the first, second, —and sixteenth slots are sequentially set as a slot N1 for the first node, a slot N2 for the second node, —and a slot N16 for the sixteenth node, respectively. On the side of the slots N1 to N16 allotted to the respective nodes, when it is wanted to ensure a transmission path for use on the node corresponding to a relevant slot, it is arranged to transmit a node synchronizing signal from this node according to the control performed by the control part of it. To the node synchronizing signal there is annexed, for example, address number data imparted to each node.

Figure 6B:
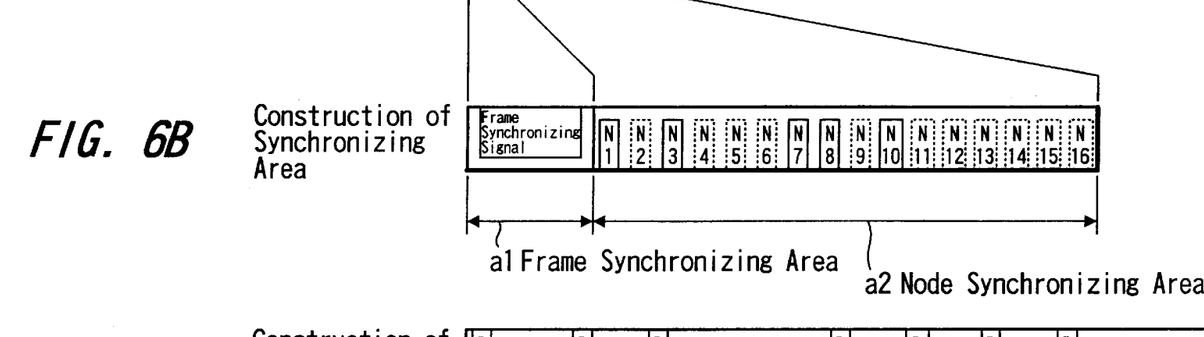

In the example illustrated in the row B of FIG. 6, illustration is made of a state where regarding the slots N1, N3, N7, N8 and N10 each indicated by the enclosure made by a solid line the transmission of a node synchronizing signal is made from the node corresponding to each of these relevant slots and regarding the remaining slots each indicated by the enclosure made by a broken line the transmission of no node synchronizing signal is made. As the nodes which are transmitting the node synchronizing signals it is considered that there are the node in which there is data to be transmitted or received, the node which is on standby in a state of its being able to make a transmission and reception, etc. As the nodes which are transmitting no node synchronizing signals it is considered that there are the node which is in a state of its having connected thereto no data processor, etc., the node regarding which even when it has connected thereto such data processor, etc. the power (the power of the transmission apparatus or the power of the data processor) is kept "off", etc.

The node synchronizing signal that is transmitted in each slot of the node synchronizing area a2 is arranged to be received by the root node and to be determined thereon by, for example, the control part thereof. At this time, from the position of the slot that has received the node synchronizing signal, it is possible to determine from what node the node synchronizing signal has been transmitted. In a case where the node has an address number annexed thereto, a determination may be made of the node from this address number.

And the control part of the root node performs polling control for the data transmission made through the use of the data transmission area a3 based on the state where the node synchronizing signal has been received thereby. That is, in the data transmission area a3, the control part of the root node transmits a response-to-polling request signal serving as a polling control signal sequentially to the nodes each needed to have a transmission path ensured for use thereon and thereby causes relevant nodes to answer. Namely, in this example, as illustrated in the row B of FIG. 6, assuming that in the node synchronizing area a2 there prevails a state where node synchronizing signals are being transmitted from the first node (slot N1), the third node (slot N3), the seventh node (slot N7), the eighth node (slot N8) and the tenth node (slot N10), in the data transmission area a3 from the root node there are sequentially transmitted as illustrated in the row C of FIG. 6 a response-to-polling request signal P1 with respect to the first node, a response-to-polling request signal P3 with respect to the third node, a response-to-polling request signal P7 with respect to the seventh node, a response-to-polling request signal P8 with respect to the eighth node and a response-to-polling request signal P10 with respect to the tenth node. To the respective response-to-polling request signals P1, P3, P7, P8 and P10 there are annexed transmission destination addresses.

In the node having an address designated by the response-to-polling request signal, when this node has data that is to be transmitted, upon its reception of this response-to-polling request signal it immediately performs transmission processing of the data. As the transmission processing performed at this time, it is considered to selectively use, for example, data transmission made in an asynchronous transmission mode and data transmission made in an isochronous transmission mode according to the kind of the data to be transmitted. Regarding the asynchronous transmission mode and the isochronous transmission mode, the former is used for the transmission of relatively short data such as control data or the like and the latter is used for the transmission of data needed to be transmitted on a real time basis such as video data, audio data or the like. Up to here, the processing is the same as that (for example, the processing illustrated in FIG. 4) explained in the first embodiment.

Here, in this embodiment, it is arranged that the transmission of each response-to-polling request signal is started immediately after the reception of the response signal from the immediately preceding node has been detected. In other words, when a response signal has been transmitted from each node having received the response-to-polling request signal that has been transmitted from the root node, the carrier and the like of this response signal are directly detected within the root node to thereby discriminate directly the presence or absence of the response signal, whereby it is arranged that when the root node has determined that the transmission of the response signal has been terminated, the root node immediately starts the transmission of the next response-to-polling request signal.

Figure 6C:
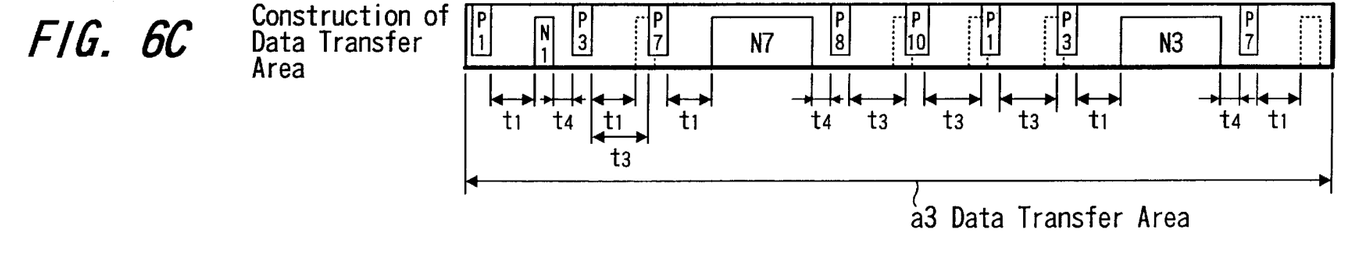

Explaining more specifically with reference to the row C of FIG. 6, when the response-to-polling request signal P1 is transmitted from the root node, after a time period $t_1$ needed to decode and discriminate this signal P1 received by the first node has lapsed, a response signal N1 having relatively short data is transmitted from the first node. Upon transmission of this response signal N1, the signal N1 is received by the node having a transmission destination address annexed to this signal N1 and is received also by the root node. Here, although on the side of the root node this signal is decoded, even before this decoding is completed, the root node immediately starts the transmission of the response-to-polling request signal P3 with respect to the next node when having determined from the detection of the carrier of the response signal, etc. that the transmission of the response signal has ceased to be made (in the example illustrated in the row C of FIG. 6, when a very short period of time $t_4$ needed to discriminate the cease of the response signal N1 from the transmission has lapsed). Similarly, after the transmission of the response signals N7 and N3 has been made, also, the root node immediately starts the transmission of the response-to-polling request signal with respect to the next node after the passage of the very short period of time $t_4$ after the cease thereof from the transmission.

Also, on the side of each node, when the node is in a state having no data therein that is to be transmitted therefrom, it does not transmit a response signal even when the response-to-polling request signal with respect thereto has been made. And, on the side of the root node, when the root node has discriminated that no signal is transmitted even when a time period $t_3$ which is somewhat longer than the time period $t_1$ from the transmission of the response request signal to the transmission of a response signal has lapsed, the root node determines that the relevant node has no transmission data and sends a response-to-polling request signal to a next node.

In this way, so long as the data transmission area a3 of the 1 frame period lasts, the root node transmits the response-to-polling request signal sequentially. In the frame example illustrated in the row C of FIG. 6, when the root node transmits the response-to-polling request signal P7 to the seventh node and no response signal has been transmitted from this seventh node, since the remaining time period of the data transmission area a3 is not sufficient to cause data transmission through polling, at this point in time there is terminated the polling processing performed through the use of this area a3. And, when the data transmission area of a next frame period comes, the polling processing is re-started from the transmission of the response-to-polling request signal with respect to the next node (here the tenth node).

The processing on other portions than those mentioned above are the same as that explained in the above-described first embodiment.

By the processing performed in this way, the radio transmission among the nodes within the network is excellently performed with a high efficiency through the polling control of the root node. Namely, the root node determines the nodes each needed to ensure a transmission path for use thereon according to the data that have been obtained during the node synchronizing areas of the respective frames and is only needed to transmit the response-to-polling request signals each constituting the polling control signal to such nodes. In other words, the root node is not needed to transmit the response-to-polling request signal to every node within the network, with the result that highly efficient transmission processing can be performed.

Here, in this embodiment, after the transmission of the response signal from each node has been made, the root node discriminates the response signal directly from the detection of the carrier or the like. And when the root node has discriminated that the transmission of this response signal has ceased to be made, it immediately starts to transmit the next response-to-polling request signal. Therefore, the polling operation is quickly performed whereby more highly efficient transmission can be performed.

Also, as similar to the case of the first embodiment, when having transmitted the response-to-polling request signal to each node, it is arranged that in a case where no data exists which is to be transmitted from the relevant node, no response signal is caused to be transmitted. Therefore, it is possible to omit the transmission processing of the response signal in the case where no transmission signal exists. Therefore, this embodiment has also the advantage of enabling the omission of the processing on the side of each node and the shortening of the time period needed to detect the response signal.

Figure 7A:
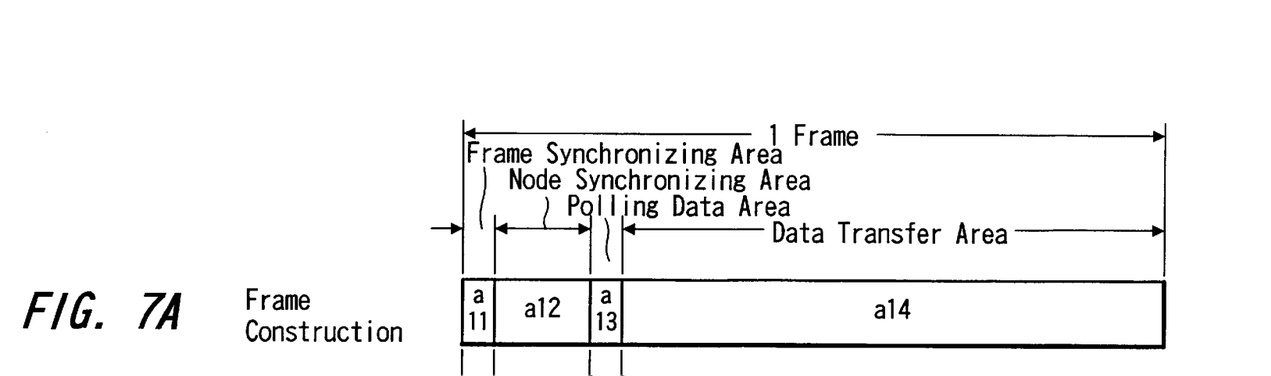
FIGS. 7A~7C are explanatory views illustrating a transmission data construction according to a third embodiment of the present invention.

Next, a third embodiment of the present invention will be explained with reference to FIGS. 7 and 8.

In this third embodiment, as in the case of the above-described first and second embodiments, the invention is applied to a communication network system that has been constructed as a system for performing transmission and reception of video data, audio data, computer data, etc. within a home, an office relatively small in scale, or the like. The construction of the network system is the same as that (for example, the construction illustrated in FIG. 1) explained in the first embodiment. Namely, the network system according to this embodiment is arranged in such a way that a network is made up of radio transmission apparatuses the number of which is sixteen at maximum. To the respective radio transmission apparatuses there are individually connected various processors such as a video signal reproduction apparatus, a monitor apparatus, a computer apparatus, a printer apparatus, etc. When data transmission is needed among these processors, data transmission is performed by way of the radio transmission apparatuses to which those processors are connected. The sixteen radio transmission apparatuses function as nodes which are communicating stations and are individually given addresses as first to sixteenth nodes. Also, the system is constructed in such a way that an arbitrary one radio transmission apparatus within the network system is set as a root node functioning as a control station and the radio communication among the nodes is executed through a polling control made from this root node.

The construction of each radio transmission apparatus is fundamentally the same as that (for example, the construction illustrated in FIG. 2) explained in the first embodiment, excepting that the control construction in the control part somewhat differs from that in the latter. In this embodiment, the state of polling control somewhat differs from that explained in the first embodiment.

The state of polling control in this embodiment will hereafter be explained. FIG. 7 illustrates the construction of a signal that is transmitted among the nodes that fall within the network system according to this embodiment. This embodiment is set as having a construction wherein data transmission is performed through the defining of a frame period. Namely, as illustrated in the row A of FIG. 7, a 1-frame period is defined as having a prescribed length, in which an initial prescribed time period of this 1-frame period is set as a frame synchronizing area a11, a next prescribed-time period is set as a node synchronizing area a12, a next prescribed time period is set as a polling information area a13 and the remaining time period is set as a data transmission area a14. As illustrated in the row B of FIG. 7, during the time period corresponding to the frame synchronizing area a11, a frame synchronizing signal is transmitted from the root node. This frame synchronizing signal is received by other nodes, whereby with the reception timing at which this frame synchronizing signal has been received being used as a basis the frame period is set in every node. The frame synchronizing signal is constituted by data composed of a prescribed number of bits and has annexed thereto identification number data, for example, that is specific for the network system.

Within the node synchronizing area a12, sixteen slots are set at an equal interval and these sixteen slots within the 1 frame are allotted respectively to the sixteen nodes within the network system. As a method of allotting, for example, from the head slot are sequentially set as a slot N1 for the first node, a slot N2 for the second node, —and a slot N16 for the sixteenth node, respectively. On the side of the slots N1 to N16 allotted to the respective nodes, when it is wanted to ensure a transmission path for use on the node corresponding to a relevant slot, it is arranged to transmit a node synchronizing signal from this node according to the control performed by the control part of it. To the node synchronizing signal there are annexed, for example, address number data imparted to each node and transmission destination address number data of the data that is to be transmitted from each node during the data transmission area.

Figure 7B:
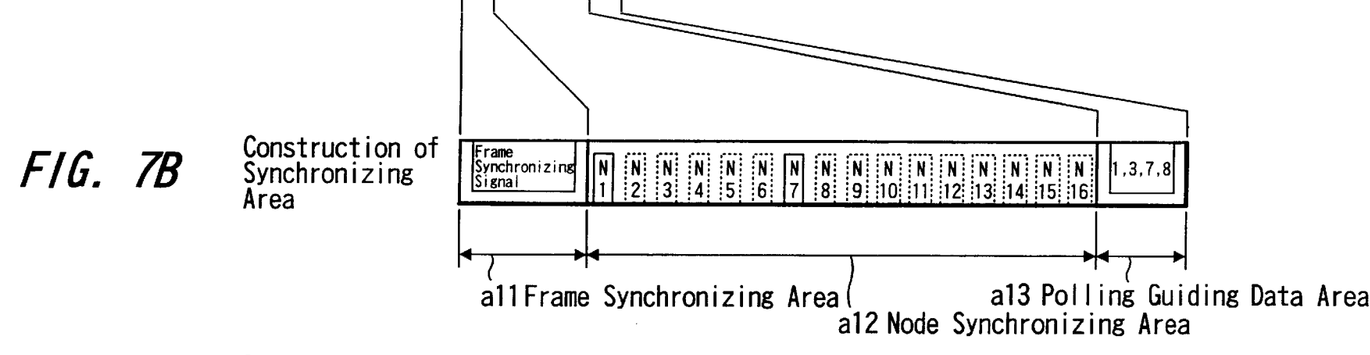
Figure 8:
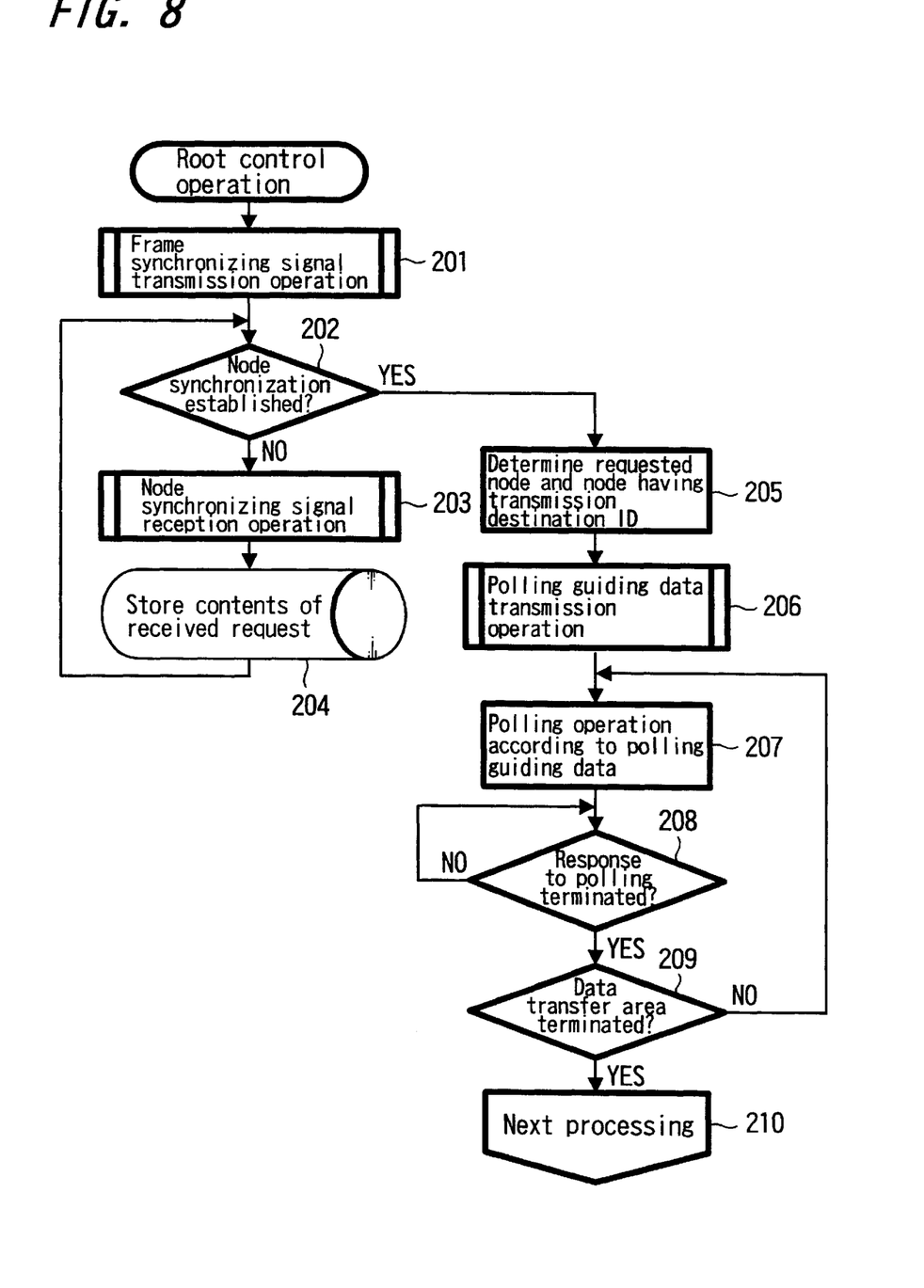
FIG. 8 is a flow chart illustrating a polling node selecting condition according to the third embodiment of the present invention.

In the example illustrated in the row B of FIG. 7, illustration is made of a state where regarding the slots N1 and N7 each indicated by the enclosure made by a solid line the transmission of node synchronizing signals is made from the nodes (the first and seventh nodes) corresponding to these relevant slots and regarding the remaining slots each indicated by the enclosure made by a broken line the transmission of no node synchronizing signal is made. Here, the nodes which are transmitting the node synchronizing signals are set as the nodes that are in a state of transmitting data (or the nodes that are on standby in a state of transmitting data).

Here, in this example, the control part of the root node determines the respective contents of the node synchronizing signal transmitted from the first node at a timing corresponding to the slot N1 and the node synchronizing signal transmitted from the seventh node at a timing corresponding to the slot N7 to thereby determine the transmission destination addresses of the data that are to be transmitted from the respective nodes. Here, it is assumed that the control part has determined that the third node and the eighth node correspond to the transmission destination addresses.

And, by the use of the data of the thus-determined transmission destination addresses and the information addresses transmitting data to the respective transmission destination addresses (i.e., the nodes that have transmitted the node synchronizing signals), polling guiding information is transmitted from the root node at a timing corresponding to the polling guiding data area a13. In this example, the nodes having transmitted the node synchronizing signals are the first and seventh nodes, and the transmission destination addresses that have been so determined by the respective node synchronizing signals correspond to the third and eighth nodes, whereby the polling guiding information designating the first, third, seventh and eighth nodes is transmitted from the root node.

Upon termination of the transmission made through the use of the polling guiding data area a13, the control part of the root node performs polling control for the purpose of the data transmission made through the use of the data transmission area a14. Namely, during the data transmission area a14, the control part of the root node transmits the response-to-polling request signals constituting the polling control signals sequentially to the nodes each requesting a transmission (here the nodes N1 and N7) and the nodes having the transmission destination addresses designated by these nodes each requesting a transmission (here the nodes N3 and N8), to thereby cause each of these relevant nodes to answer. That is, in this example, during the data transmission area a14, as illustrated in the row C of FIG. 7, from the root node, there are sequentially transmitted the response-to-polling request signal P1 with respect to the first node, the response-to-polling request signal P3 with respect to the third node, the response-to-polling request signal P7 with respect to the seventh node and the response-to-polling request signal P8 with respect to the eighth node. To the respective response-to-polling request signals P1, P3, P7, P8 there are annexed the transmission destination addresses for use thereon.

In the node having an address designated by the response-to-polling request signal, when this node has data therein that is to be transmitted therefrom, upon its reception of this response-to-polling request signal it immediately performs transmission processing of the data. As the transmission processing performed at this time, it may be considered to selectively use, for example, data transmission made in an asynchronous transmission mode and data transmission made in an isochronous transmission mode according to the kind of the data to be transmitted.

Here, the processing of selecting the polling node which in a case where the data transmission processing is performed in this way is executed by the control part of the root node will be explained with reference to a flow chart of FIG. 8. As the control operation performed in the root node, first, the transmission operation of transmitting a frame synchronizing signal is performed (step 201) and it is determined next whether or not a node synchronization has been established (step 202). Since immediately after transmission of a frame synchronizing signal has been made the node synchronization has not yet been established, the process proceeds to step 203 in which the reception operation of receiving a node synchronizing signal is performed. At this time, the control part of the root node stores therein the contents of the data received thereby during the respective slots within the node synchronizing area (the transmission origin addresses, transmission destination addresses, etc.) beforehand (step 204) and then proceeds to the determination processing in step 202.

When it has been determined in step 202 that the node synchronization has been established, the process proceeds to step 205 in which the root node determines the address of the node from which a request for polling has been made and the node indicated by the transmission destination address (step 205) based on the data stored already in step 204 and transmits during the polling guiding data area a13 the polling guiding information having contained therein address data that includes the thus-determined polling requested address and the transmission destination address (step 206). And the root node performs the polling operation (i.e., the transmission operation of transmitting the response-to-polling request signal) with respect to the node corresponding to each address indicated by the polling guiding information (step 207). Here, it is determined whether or not the response to the polling operation has been terminated (step 208) and, when a termination has been made, it is determined whether or not the data transmission (transfer) area is terminated (step 209). In a case where the rest of the data transmission area is still sufficient to perform the polling operation, the process returns to step 207 in which the polling operation with respect to a next node is performed. When it has been determined in step 209 that the rest of the data transmission area is not sufficient, the processing performed on this frame period is terminated whereby a transfer is made to the processing for the next frame period (step 210).

By the processing performed in this way, as similar to the case explained in the above-described first and second embodiments, the radio transmission among the nodes within the network is excellently performed with a high efficiency through the polling control of the root node. Namely, the root node determines the nodes each needed to ensure a transmission path for use thereon according to the data that have been obtained during the node synchronizing areas of the respective frames and is only needed to transmit the response-to-polling request signals each constituting the polling control signal to such nodes. Namely, the root node is not needed to transmit the response-to-polling request signal to every node within the network, with the result that highly efficient transmission processing can be performed.

And, in the case of this embodiment, the root node transmits the response-to-polling request signal also with respect to the node having a transmission destination address for the data that is to be transmitted within the network. As a result of this, in a case where the node has data therein that is to be return transmitted with respect to the data that has been received thereby, it is possible to immediately perform return transmission processing thereon, etc. In consequence, the processing such as confirmation processing on the transmission state or the like can be excellently performed through the polling control.

Figure 7C:
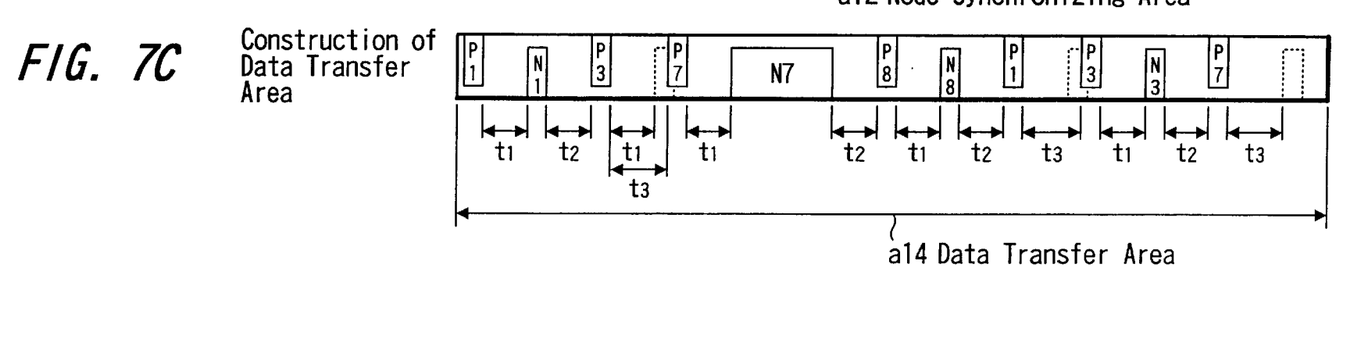

It is to be noted that although in the example illustrated in FIG. 7 it is arranged that a determination of the transmission destination address is made from the frame synchronizing signal to thereby notify the polling guiding information including this transmission destination address by the use of the polling guiding data area, the transmission destination address may be determined from another signal (e.g., the transmission destination address that has been imparted to the data transmitted actually through the use of the data transmission area). Also, it is to be noted that it may be arranged to transmit the response-to-polling request signal from the root node directly to the transmission destination address. through the use of the data transmission area without notifying it as the polling guiding information beforehand.

Also, the frame constructions explained in the above-described respective embodiments are only suitable examples and the invention is not limited to such frame constructions and permits the use of various frame constructions suitable for the transmission method or the like applied to the network system. For example, although in the above-described respective examples the frame synchronizing area and the node synchronizing area have been disposed in the leading portion of each frame, such areas may be disposed in other positions within one frame. Also, although it has been arranged that the node synchronizing signal is transmitted at every frame during the 1-frame period, it may be arranged to transmit the node synchronizing signal only once a per prescribed number of frames. Also, the node transmitting the frame synchronizing signal may be separate from the root node performing polling control based on the data obtained during the node synchronizing area or the like.

According to the polling control method as viewed from a first aspect of the present invention, the polling control can be executed within the data transfer area with respect to only the communicating station that has been determined as being needed to make a communication by the communication made using the managing data transmission area, with the result that highly efficient polling control is possible.

According to the polling control method as viewed from a second aspect of the present invention, in the invention according to the preceding first aspect, a signal regarding the presence or absence of data to be transmitted is transmitted from each communicating station at a timing corresponding to the managing data transmission area. Therefore, it becomes possible to perform polling control with respect to only the communicating station having data therein that is to be transmitted therefrom, with the result that highly efficient polling control is possible.

According to the polling control method as viewed from a third aspect of the present invention, in the invention according to the preceding first aspect, the managing data transmission area is divided into a plurality of slots and a plurality of the communicating stations are respectively allotted to the respective slots, whereby a signal for ensuring a transmission path is transmitted from a corresponding one of the communicating stations at a timing corresponding to the corresponding allotted slot. As a result of this, on the side of each communicating station, through mere transmission therefrom of a signal corresponding to the slot allotted to the communicating station, the transmission path resulting from the polling control is ensured. Also, on the side of the control station, through mere determination made of the position of the slot at the timing of which this signal is transmitted, it is possible to determine from what communicating station a request has been made, with the result that highly efficient polling control can be realized through the performance of a simple control processing.

According to the polling control method as viewed from a fourth aspect of the present invention, in the invention according to the preceding first aspect, a response-to-polling request signal is sequentially transmitted from the control station to each communicating station needed to make communication within the data transfer area based on the data that has been obtained by the control station within the managing data transmission area. As a result of this, the polling control made using the data transfer area is performed with respect to only the communicating station needed to make a communication and no polling control is performed with respect to the communicating station not needed to make a communication. Therefore, no useless polling control is performed with the result that highly efficient polling control becomes possible.

According to the polling control method as viewed from a fifth aspect of the present invention, in the invention according to the preceding fourth aspect, when no response signal is return transmitted from the communicating station designated by the response-to-polling request signal, the control station determines that no data exists which is to be transmitted from this communicating station. As a result of this, it becomes unnecessary to make a return transmission of a response signal indicating the absence of data to be transmitted therefrom and it is possible to omit a useless data transmission to that extent.

According to the polling control method as viewed from a sixth aspect of the present invention, in the invention according to the preceding first aspect, when data having a transmission destination address annexed thereto has been transmitted to the control station, the control station performs polling control for ensuring a transmission path for use on return transmission, also, with respect to the corresponding communicating station having the transmission destination address. As a result of this, the transmission path for use on a return transmission made during the data transmission between the communicating stations, also, is ensured automatically, with the result that highly efficient setting of a transmission path is executed.

According to the transmission control apparatus as viewed from a seventh aspect of the present invention, a state of polling control is determined based on the data that has been received within the managing data transmission area within the frame period and, in the state thus determined, there is performed a polling control of the terminal apparatus by the use of the data transfer area. As a result of this, it becomes possible to perform the polling control from the control apparatus with respect to only the necessary terminal apparatus, with the result that highly efficient transmission control with no uselessness is possible.

According to the transmission control apparatus as viewed from an eighth aspect of the present invention, in the invention according to the seventh aspect, a transmission origin of data that has been received within the managing data transmission area is determined and a response-to-polling request signal is transmitted to the transmission origin. As a result of this, highly efficient transmission can be made with respect to only the terminal apparatus on which transmission processing of a response-to-polling request signal is needed to be performed.

According to the transmission control apparatus as viewed from a ninth aspect of the present invention, in the invention according to the eighth aspect, a determination is made of that in a case where no return transmission of a response signal to the response-to-polling request signal, the corresponding terminal apparatus is in a state having no transmission data therein. As a result of this, it is possible to omit the receiving processing of receiving a response signal and therefore to perform quick and highly efficient polling control.

According to the transmission control apparatus as viewed from a tenth aspect of the present invention, in the invention according to the seventh aspect, when having determined that a transmission of data having a transmission destination address annexed thereto has been made, there is transmitted a response-to-polling request signal to the corresponding terminal apparatus having the transmission destination address. As a result of this, it is possible to perform polling control for use on a return transmission made from the transmission destination of the data.

According to the transmission apparatus as viewed from the eleventh aspect of the present invention, in a case where there is the need to ensure a transmission path, a corresponding signal is transmitted during the managing data transmission area within the frame period, whereby polling control is performed with respect to the corresponding transmission apparatus. Namely, in only a case where data transmission processing is necessary, a transmission path can be ensured through polling control to thereby perform transmission processing.

According to the transmission apparatus as viewed from a twelfth aspect of the present invention, in the invention according to the eleventh aspect, by transmitting data regarding the presence or absence of data to be transmitted within the managing data transmission area, on the control apparatus side it is possible to determine whether or not polling control is needed to be performed of the relevant transmission apparatus, whereby a communication resulting from highly efficient polling control can be made with the use of this transmission apparatus.

According to the transmission apparatus as viewed from a thirteenth aspect of the present invention, in the invention according to the eleventh aspect, a determination is made on the timing of a slot allotted to this apparatus within the managing data transmission area and there is transmitted a signal for causing the procurement of a transmission path at the timing thus determined. As a result of this, transmission of a signal to the control apparatus can be performed excellently without causing overlapping of the signals from the respective transmission apparatuses.

According to the transmission apparatus as viewed from a fourteenth aspect of the present invention, in the invention according to the eleventh aspect, when no transmission data exists in the apparatus at the point in time when the apparatus has been designated by a polling control signal that is transmitted during the data transfer area, there is not transmitted thereto a signal that responds to the polling request. As a result of this, it is sufficient to respond to the polling request only when there is transmission data, so that the transmission processing becomes simplified.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A polling control method of performing polling control of communication among a plurality of communicating stations by way of a control station, the polling control method comprising the steps of:

defining a frame period by means of a synchronizing signal transmitted from a prescribed station;

setting a managing data transmission area and a data transfer area within the frame period; and performing within the managing data transmission area transmission of data for determining a state of polling control and performing within the data transfer area communication among the plurality of communicating stations based on the polling control using the data transmitted within the managing data transmission area, wherein when data having a transmission destination address annexed thereto has been transmitted to the control station, the control station performs polling control for ensuring a transmission path for use on return transmission with respect to a corresponding communicating station having the transmission destination address.

2. A polling control method according to claim 1, wherein a signal relating to a presence or absence of data to be transmitted is transmitted from each of the plurality of communicating stations at a timing corresponding to the managing data transmission area.

3. A polling control method according to claim 1, wherein the managing data transmission area is divided into a plurality of slots and each of the plurality of communicating stations is allotted a respective one of the plurality of slots such that a signal for obtaining a transmission path is transmitted from one of the plurality of communicating stations at a timing corresponding to a corresponding allotted slot of the plurality of slots.

4. A polling control method according to claim 1, further comprising the step of sequentially transmitting a response-to-polling request signal from the control station to a communicating station designated for communication within the data transfer area based on the data obtained by the control station within the managing data transmission area.

5. A polling control method of communication among a plurality of communicating stations by way of a control station, the polling control method comprising the steps of:

defining a frame period by means of a synchronizing signal transmitted from a prescribed station;

setting a managing data transmission area and a data transfer area within the frame period;

performing within the managing data transmission area transmission of data for determining a state of polling control and performing within the data transfer area communication among the plurality of communicating stations based on the polling control using the data transmitted within the managing data transmission area; and sequentially transmitting a response-to-polling request signal from the control station to a communicating station designated for communication within the data transfer area based on the data obtained by the control station within the managing data transmission area, wherein when no response signal is return transmitted from the communicating station designated for communication, the control station determines that no data exists which is to be transmitted from the communicating station designated for communication.

6. A transmission control apparatus for controlling communication among a plurality of terminal apparatuses, comprising:

communication timing setting means for setting a frame period and for setting within the frame period a managing data transmission area and a data transfer area;

receiving means for receiving within the managing data transmission area data for determining a state of polling control; and transmitting means for transmitting a polling control signal for causing a transmission to be made from a terminal apparatus within the data transfer area based on the data received within the managing data transmission area, wherein when the receiving means determines that a transmission of data having a transmission destination address annexed thereto has been made the transmitting means transmits a response-to-polling request signal to a terminal apparatus having the transmission destination address.

7. A transmission control apparatus according to claim 6, wherein a transmission origin of the data received by the receiving means within the managing data transmission area is determined by the receiving means, and the transmitting means transmits a response-to-polling request signal to the transmission origin.

8. A transmission control apparatus for controlling communication among a plurality of terminal apparatuses, comprising:

communication timing setting means for setting a frame period and for setting within the frame period a managing data transmission area and a data transfer area;

receiving means for receiving within the managing data transmission area data for determining a state of polling control; and transmitting means for transmitting a polling control signal for causing a transmission to be made from a terminal apparatus within the data transfer area based on the data received within the managing data transmission area, wherein a transmission origin of the data received by the receiving means within the managing data transmission area is determined by the receiving means, and the transmitting means transmits a response-to-polling request signal to the transmission origin; and determining means for determining that when no response signal is return transmitted in response to the response-to-polling request signal the terminal apparatus has no data for transmission therein.

9. A transmission apparatus permitted to make a communication through a polling control performed from a prescribed control apparatus, comprising:

timing setting means for setting a frame period based on a prescribed synchronizing signal and for setting within the frame period a managing data transmission area and a data transfer area; and transmitting means for transmitting within the managing data transmission area a signal for ensuring a transmission path and for performing data transmission within the data transfer area based on a polling control signal from the control apparatus, wherein when no transmission data exists in the apparatus at a point in time when the apparatus is designated by a polling control signal transmitted during the data transfer area, the transmitting means does not transmit a signal in response to the polling control signal.

10. A transmission apparatus according to claim 9, wherein data relating to a presence or absence of data to be transmitted is transmitted from the transmitting means within the managing data transmission area.

11. A transmission apparatus according to claim 9, wherein the timing setting means determines a timing of a slot allotted to an apparatus within the managing data transmission area, and the transmitting means transmits a signal for procuring a transmission path at the determined timing.

* * * * *